US011003727B2

(12) United States Patent
Bartholomew

(10) Patent No.: US 11,003,727 B2
(45) Date of Patent: May 11, 2021

(54) REAL-TIME DISTRIBUTION AND ADJUSTMENT OF CONTENT PLACEMENT

(71) Applicant: GrubHub Holdings Inc., Chicago, IL (US)

(72) Inventor: Benjamin M. Bartholomew, Jersey City, NJ (US)

(73) Assignee: Grubhub Holdings, Inc., Chicago, IL (US)

( * ) Notice: Subject to any disclaimer, the term of this patent is extended or adjusted under 35 U.S.C. 154(b) by 205 days.

(21) Appl. No.: 15/924,833

(22) Filed: Mar. 19, 2018

(65) Prior Publication Data

US 2019/0266289 A1    Aug. 29, 2019

Related U.S. Application Data

(60) Provisional application No. 62/636,330, filed on Feb. 28, 2018.

(51) Int. Cl.
G06F 16/9535 (2019.01)
G06F 7/58 (2006.01)
G06F 16/907 (2019.01)
G06F 16/2457 (2019.01)

(52) U.S. Cl.
CPC .......... *G06F 16/9535* (2019.01); *G06F 7/588* (2013.01); *G06F 16/24578* (2019.01); *G06F 16/907* (2019.01)

(58) Field of Classification Search
CPC .............. G06F 16/9535; G06F 16/907; G06F 16/24578; G06F 7/588; G06F 16/951
USPC ......................................................... 707/748
See application file for complete search history.

(56) References Cited

U.S. PATENT DOCUMENTS

| 2011/0087665 | A1* | 4/2011 | Weare | G06F 16/68 707/737 |
| 2012/0110173 | A1* | 5/2012 | Luna | H04L 69/28 709/224 |
| 2012/0151383 | A1* | 6/2012 | Kazan | G06Q 10/101 715/753 |
| 2012/0254180 | A1* | 10/2012 | Biderman | H04L 67/1095 707/737 |
| 2013/0073473 | A1* | 3/2013 | Heath | G06Q 30/02 705/319 |

(Continued)

*Primary Examiner* — Syed H Hasan
*Assistant Examiner* — Nicholas E Allen
(74) *Attorney, Agent, or Firm* — Baker Botts L.L.P.

(57) ABSTRACT

Techniques related to real-time distribution and adjustment of content placement are disclosed. A database stores score values respectively corresponding to content items. Computing device(s) are coupled to the database and to digital data storage device(s) storing instructions that cause the computing device(s) to perform a method for adjusting, at runtime, visibility of a particular content item. The method comprises computing a random value for the particular content item based on an identifier for a communication session between the computing device(s) and a client device. The method further comprises generating an adjusted score value for the particular content item based on combining the random value with a particular score value corresponding to the particular content item. Still further, the method comprises sending, to the client device via the communication session, the content items including the particular content item, which is sorted among the content items according to the adjusted score value.

20 Claims, 10 Drawing Sheets

(56) References Cited

U.S. PATENT DOCUMENTS

| | | | |
|---|---|---|---|
| 2013/0145367 A1* | 6/2013 | Moss | H04L 43/04 718/1 |
| 2013/0325870 A1* | 12/2013 | Rouse | G06F 16/41 707/741 |
| 2014/0199046 A1* | 7/2014 | Lindsey | G06T 11/60 386/244 |
| 2015/0278876 A1* | 10/2015 | Xiong | G06Q 30/0277 705/14.71 |
| 2015/0332314 A1* | 11/2015 | Chakraborty | G06Q 50/01 705/14.45 |
| 2015/0356447 A1* | 12/2015 | Lowe | G06N 5/046 706/47 |
| 2015/0379429 A1* | 12/2015 | Lee | G09B 5/00 706/11 |
| 2015/0381543 A1* | 12/2015 | Hong | H04W 4/029 709/203 |
| 2016/0065641 A1* | 3/2016 | Chesluk | H04L 67/306 709/219 |
| 2016/0065999 A1* | 3/2016 | Chesluk | H04N 21/4788 725/14 |
| 2016/0225012 A1* | 8/2016 | Ha | G06Q 30/0242 |
| 2016/0227464 A1* | 8/2016 | Senarath | G08G 1/096716 |
| 2016/0239571 A1* | 8/2016 | Rowe | G06F 16/9535 |
| 2016/0358229 A1* | 12/2016 | Bhalgat | H04L 51/32 |
| 2016/0373891 A1* | 12/2016 | Ramer | H04W 4/029 |
| 2017/0017634 A1* | 1/2017 | Levine | G06Q 30/0641 |
| 2017/0046036 A1* | 2/2017 | Yokota | G06F 3/1243 |
| 2017/0187822 A1* | 6/2017 | Thomee | G06F 16/95 |
| 2017/0199888 A1* | 7/2017 | Toksoz | G06Q 30/0241 |
| 2017/0244770 A1* | 8/2017 | Eckerdal | G06F 16/639 |
| 2017/0371853 A1* | 12/2017 | Durbin | G06F 17/212 |

\* cited by examiner

FIGURE 3

TABLE 300

| DEVICE ID 302 | CONTENT ITEM ID 304 | TIME 306 | CONVERSION AMOUNT 308 |
|---|---|---|---|
| 00:14:22:01:23:45 | 15813486544 | TUE 07-25-17 11:19:23 | $10.62 |
| 00:A0:C9:14:C8:29 | 15813486544 | TUE 07-25-17 11:31:47 | $15.34 |
| 00:1C:B3:09:85:15 | 15813486544 | TUE 07-25-17 12:03:56 | $17.29 |
| 00:04:DC:34:2C:A6 | 15813486544 | TUE 07-25-17 12:29:18 | $20.86 |
| 00:14:22:01:23:45 | 3813700443307 | TUE 07-25-17 17:48:35 | $57.08 |
| 00:1C:B3:09:85:15 | 3813700443307 | TUE 07-25-17 18:52:09 | $63.47 |
| 00:A0:C9:14:C8:29 | 3813700443307 | TUE 07-25-17 19:06:33 | $72.51 |

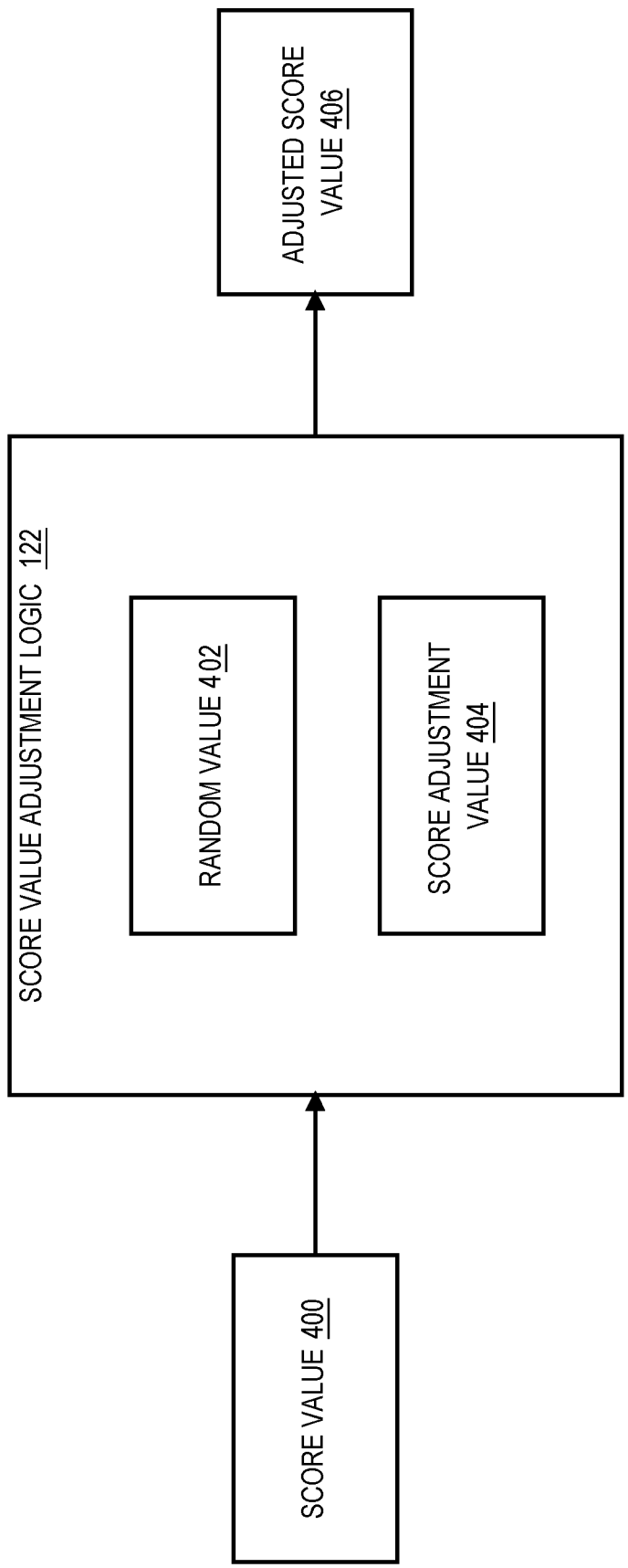

REAL-TIME DISTRIBUTION AND ADJUSTMENT OF CONTENT PLACEMENT

CROSS-REFERENCE TO RELATED APPLICATIONS; BENEFIT CLAIM

This application claims the benefit of Provisional Appln. 62/636,330, filed Feb. 28, 2018, the entire contents of which is hereby incorporated by reference as if fully set forth herein, under 35 U.S.C. § 119(e).

TECHNICAL FIELD

The present disclosure generally relates to the technical field of computer-implemented machine learning in the context of content presentation. More specifically, the present disclosure relates to the technical field of real-time distribution and adjustment of content placement. SUGGESTED ART UNIT: 2170.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When rendered to users, content items are typically organized according to a sorted order that is based on rankings of the content items. For example, content items with relatively high rankings may be positioned toward the top of a display page, and content items with relatively low rankings may be positioned toward the bottom of a display page. Rankings may be based on popularity, ratings, relevance, and/or the like.

Some ranking algorithms adjust the rankings based on user interaction with the content items. Nevertheless, the rankings may exhibit little, if any, variance. For example, the same set of content items that appear "above the fold" are likely to continue appearing "above the fold". Likewise, content items that are rendered "below the fold" are likely to continue being rendered "below the fold". One reason for this phenomenon is that content items positioned "above the fold" have the benefit of superior visibility relative to content items positioned "below the fold". Thus, users tend to interact with "above-the-fold" content items more often than with "below-the-fold" content items. Like a self-fulfilling prophecy, this tendency generally reinforces the initial ordering of content items. Thus, the content item rankings may continue to be inaccurate reflections of user preferences, thereby causing users to remain unaware of content items that would be of interest.

Some approaches introduce greater variance in rankings involve varying the rankings according to time periods. For example, a first set of content items may be highly ranked in the morning, a second set of content items may be highly ranked in the afternoon, and a third set of content items may be highly ranked in the evening. However, for the same reasons mentioned above, these approaches introduce bias in favor of the highly-ranked content items albeit during different time periods.

At the same time, it is beneficial to maintain some consistency in content item rankings. For example, a user who submits the same query multiple times within a brief time period expects to view the same set of content items in the same sorted order. If the sorted order and/or the set of content items changes between submissions, the user may miss opportunities to interact with some content items of interest.

Thus, what is needed is improved technology for adjusting content item placement in a manner that comports with user expectations of consistency in content item rankings.

SUMMARY

The appended claims may serve as a summary of the disclosure.

BRIEF DESCRIPTION OF THE DRAWINGS

In the drawings:

FIG. 3 illustrates example user interaction data.

FIG. 4 illustrates an approach for generating an adjusted score value.

DETAILED DESCRIPTION

Figure 1:
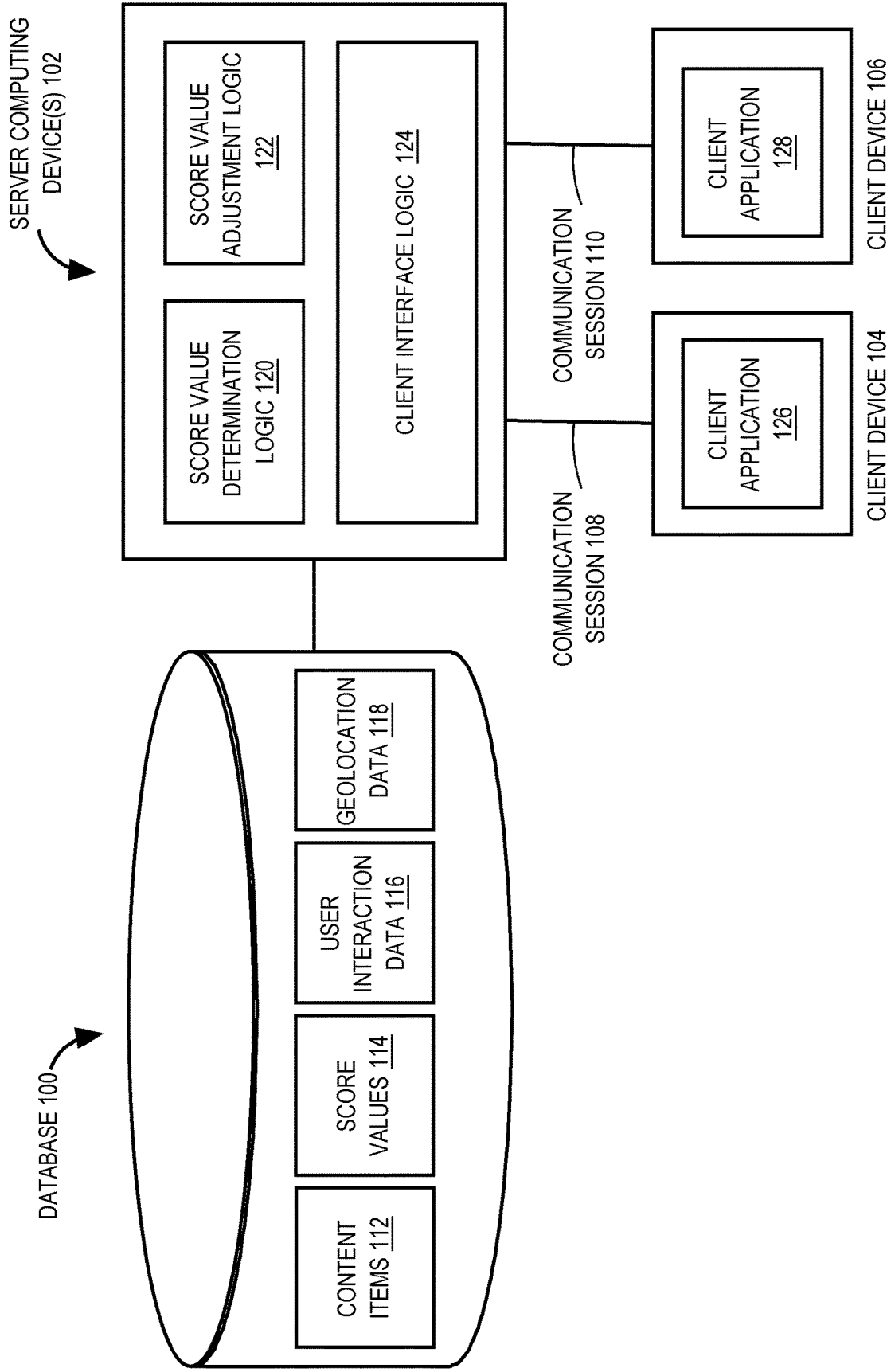
FIG. 1 illustrates an example computer architecture on which embodiments may be implemented.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. The description is provided according to the following outline:

1.0 Introduction
2.0 Example Computer Architecture
   2.1 Database
      2.1.1 Content Items
      2.1.2 Score Values
      2.1.3 User Interaction Data
      2.1.4 Geolocation Data
   2.2 Server Computing Device(s)
      2.2.1 Score Value Determination Logic
      2.2.2 Score Value Adjustment Logic
      2.2.3 Client Interface Logic
   2.3 Client Device(s)
3.0 Score Value Determination
   3.1 User Interaction Data
   3.2 Computation of Averages
   3.3 Exponentially-Decaying Weights
   3.4 Adjustments to Averages
   3.5 Score Value Formulas 4.0 Score Value Adjustment
  4.1 Random Value
  4.2 Score Adjustment Value
  4.3 Multi-Phase Score Values
  4.4 Multiple Sets of Rankings
5.0 Process Overview
6.0 Implementation Example—Hardware Overview
7.0 Extensions and Alternatives
1.0 Introduction Described herein is a balanced approach for randomizing rankings. Some aspects of this disclosure provide technical solutions for enabling a machine to accurately assess user preferences that are reflected in content item rankings. Some aspects of this disclosure provide technical solutions for enabling a machine to balance demand across content items, such as by adjusting content item rankings in response to resource constraints. Some aspects of this disclosure provide technical solutions for enabling a machine to adjust content item rankings in a manner that exhibits consistency throughout user sessions. Some aspects of this disclosure provide technical solutions for enabling a machine to serve the most relevant content items most of the time.

The machine may be included in a computer system that is programmed for adjusting, at runtime, the visibility of one or more content items. The visibility of a content item is determined based on a ranking of the content item. In turn, content item rankings are determined based on score values of content items.

In some embodiments, the computer system includes a database that is configured to store, at a minimum, intrinsic score values for content items. Each intrinsic score value corresponds to a respective content item. An intrinsic score value of a content item may be computed based, at least in part, on user interaction with the content item. For example, when the content item was previously rendered at a client device, a user may have clicked on the content item, thereby causing an increase in its intrinsic score value.

Additionally or alternatively, the computer system includes server computer(s) that are coupled to a database like the one mentioned above. The server computer(s) may be coupled to digital data storage device(s) storing instructions that cause the server computer(s) to perform a method for adjusting, at runtime, the visibility of one or more content items.

The method may involve the server computer(s) interacting with a database like the one mentioned above to store intrinsic score values of content items. The server computer(s) may compute the intrinsic score values prior to storing them in the database. The intrinsic score values may be computed using exponentially-decaying weights, normalization factors, and/or the like.

Additionally or alternatively, the method may involve the server computer(s) generating an adjusted score value. The server computer(s) may generate the adjusted score value based on combining a random value with an intrinsic score value that corresponds to a content item. The random value may be computed based on an identifier for a communication session between the server computer(s) and a client device. In some embodiments, a hash function may be applied to a session identifier and an attribute of a content item to produce a pseudorandom number between 0 and 1 for that content item. In some embodiments, a session identifier may be used as a seed value for a pseudorandom number generator that takes, as input, an attribute of the content item. Thus, the random value for a particular content item remains the same throughout a particular user session but may be different for another user session that is concurrently established.

Prior to combining the random value with the intrinsic score value, a score adjustment value may be determined. A score adjustment value may be any value, such as a weight value, that can be used to modify the random value and/or the intrinsic score value. The score adjustment value may increase the visibility of the content item, decrease the visibility of the content item, exclude the content item from a set of content items to be rendered at a client device, and/or the like.

In some embodiments, the score adjustment value is determined based, at least in part, on estimating the number of impressions that will result in a desired number of conversions within a particular time period. The desired number of conversions may be used to confirm/modify an intrinsic score value, offload estimated conversions from a different content item that is over-utilized, and/or the like.

In some embodiments, the score adjustment value is determined based, at least in part, on geolocation data collected from the client device. For example, score adjustment values may cause content items to be sorted according to their respective distances from a particular geolocation. The particular geolocation may be a current geolocation of the client device, the center of a city/region corresponding to a ZIP code, a future location of the client device, one or more points along a predicted travel path for the client device, and/or the like.

The method may further involve the server computer(s) sending, to the client device via the communication session, a set of content items. The set of content items may include a content item for which an adjusted score value was generated. The content item may be sorted among the set of content items according to the adjusted score value.

In some embodiments, the adjusted score value causes the content item to be rendered, at the client device, in a visible region of an output instead of being rendered in a non-visible region of the output. In some embodiments, the adjusted score value causes the content item to be rendered, at the client device, in a non-visible region of an output instead of being rendered in a visible region of the output.

2.0 Example Computer Architecture

FIG. 1 is a block diagram that illustrates an example computer architecture on which embodiments may be implemented. Referring to FIG. 1, database 100 is communicatively coupled to server computing device(s) 102, which is communicatively coupled to client devices 104-106. Although depicted in FIG. 1 as communicatively coupled to only two client devices for clarity and ease of explanation, it should be appreciated that server computing device(s) 102 may be communicatively coupled to any number of client devices.

2.1 Database

In the example of FIG. 1, database 100 stores content items 112, score values 114, user interaction data 116, and geolocation data 118. Although depicted in FIG. 1 as a single database for clarity and ease of explanation, it should be appreciated that database 100 may represent any number of storage devices, files, data structures, and/or the like. For example, database 100 may be stored in shared memory accessible to multiple computing devices.

2.1.1 Content Items

Referring to FIG. 1, content items 112 represents a pool of content that may be rendered to a user at a client device. Examples of content items 112 include links, images, text, and/or the like. Content items 112 may or may not be returned as search results in response to a search request that includes a query. For example, content items 112 may include advertisements for restaurants, hyperlinks to restaurant menu pages, restaurant summary information, digital images of dishes prepared by restaurants, restaurant ratings information, and/or restaurant pricing information. As used herein, a webpage, a mobile webpage, and a mobile app page are collectively referred to as a "page". It should be appreciated that content items 112 are not limited to commercial pages. For example, content items 112 may include references to and/or information about online encyclopedia articles.

In some embodiments, a content item is referenced using a unique identifier. For example, a database table may store mappings between content items 112 and unique identifiers. Thus, individual content items 112 may thereafter be referenced, in the database table and/or in other database tables, using the unique identifiers.

2.1.2 Score Values

Score values 114 respectively correspond to content items 112. For example, a database table may map content items 112 to score values 114. As will be described in greater detail below, score values 114 may be computed based, at least in part, on user interaction with corresponding content items. For example, score values 114 may be computed based on numbers of impressions, visible impressions, click-through events, conversions, and/or the like. As used herein, an "impression" is an instance when a content item is rendered in a visible region or a non-visible region of an output page. In other words, impressions may include visible impressions and non-visible impressions.

Score values 114 may be computed based on one or more averages of user interaction data 116. For example, a particular score value may be computed based on an average click-through rate and/or an average conversion rate. In some embodiments, a score value is computed based on applying exponentially-decaying weights to one or more averages of user interaction data 116. In some embodiments, one or more normalization factors are applied to the one or more averages of user interaction data 116. For example, the one or more normalization factors may be used to reduce/eliminate outliers, compensate for a small/non-existent set of data points, and/or distinguish visible impressions from non-visible impressions.

2.1.3 User Interaction Data

User interaction data 116 refers to digital computer input data that is received as a result of requests and responses that can be correlated to user interaction with content items. Selecting and viewing a content item, selecting a link to further explore a content item, purchasing a product or service based on using a link associated with a content item, and other input can indicate user interaction with content items, for example.

In some embodiments, user interaction data 116 is stored in database 100 as historical user interaction data. User interaction data 116 may be stored as any of a variety of metrics, including a number of views, a number of click-through events, a number of conversions, and/or the like. Additionally or alternatively, user interaction data 116 may be organized according to the client devices from which they were collected, the content items with which users interacted, and/or the like. A non-limiting example of user interaction data 116 is provided below in association with FIG. 3.

2.1.4 Geolocation Data

In some embodiments, geolocation data 118 is stored in database 100. Geolocation data 118 may include an identification of a physical location associated with a content item. For example, geolocation data 118 may include the longitude and the latitude of a restaurant advertised by a content item. Geolocation data 118 may be used to determine a meaningful description of a physical location that includes a street address, a city, a state, a country, and/or a ZIP code. Additionally or alternatively, geolocation data 118 may be used to identify content items having locations within a particular geographic region.

Furthermore, geolocation data 118 may include historical location information organized according to the client device from which it was collected. As will be described in greater detail below, this enables predicting a travel path for a particular client device.

2.2 Server Computing Device(s)

Although depicted in FIG. 1 as a single block for clarity and ease of explanation, it should be appreciated that server computing device(s) 102 may include any number of computing devices including front-end servers, back-end servers, and/or load-balancing servers. Server computing device(s) 102 may include one or more digital data storage devices that store instructions for execution by the server computing device(s) 102. In some embodiments, the instructions are separated into various logical components. In the example of FIG. 1, server computing device(s) 102 include score value determination logic 120, score value adjustment logic 122, and client interface logic 124. The various logical components may be implemented as software, hardware, and/or firmware.

2.2.1 Score Value Determination Logic

Score value determination logic 120 computes score values 114 that respectively correspond to content items 112. A score value for a content item may be computed based, at least in part, on any historical user interaction data that was collected, at a client device, for the content item. Thus, score value determination logic 120 may receive, as input, references to content items 112 and any user interaction data 116 that corresponds to content items 112. Examples of references to content items 112 include content item identifiers, pointers, and/or the like. In some embodiments, score value determination logic 120 retrieves references to content items 112 and any corresponding user interaction data 116 from database 100. In response to receiving the input, score value determination logic 120 may output score values 114 for content items 112. In some embodiments, score value determination logic 120 stores score values 114 in database 100.

As will be described in greater detail below, score values may be computed using any number of techniques. Non-limiting examples of the techniques include aggregating historical user interaction data according to time periods of collection, averaging historical user interaction data for particular time periods of collection, applying weights to particular time periods of collection, and/or normalizing historical user interaction data.

2.2.2 Score Value Adjustment Logic

Score value adjustment logic 122 generates adjusted score values for selected content items. In some embodiments, score value adjustment logic 122 automatically selects the content items for which score values are to be adjusted. Thus, score value adjustment logic 122 may receive, as input, score values and/or references to content items. In some embodiments, score value adjustment logic 122 retrieves score values and/or references to content items from score value determination logic 120 and/or database 100. In response to receiving the input, score value adjustment logic 122 may output adjusted score values. In some embodiments, score value adjustment logic 122 stores adjusted score values in database 100.

When score value adjustment logic 122 automatically selects the content items for which score values are to be adjusted, score value adjustment logic 122 may retrieve, from database 100, score values corresponding to the selected content items, sort the score values, and/or select one or more score values for adjustment. For example, score value adjustment logic 122 may sort retrieved score values in a decreasing order and select a relatively high score value and/or a relatively low score value for adjustment. However, it should be appreciated that selection of the one or more score values for adjustment may be based on any number of a variety of criteria including selecting every nth score value, selecting score values likely/not likely to be rendered in a visible region of known dimensions, and/or the like.

An adjusted score value is derived based on adding a positive/negative score differential to a score value. As used herein, a score differential used to increase a score value is called a "buff" amount, and a score differential used to decrease a score value is called a "nerf" amount.

As will be described in greater detail below, score values may be adjusted automatically using any number of techniques. Non-limiting examples of the techniques include computing a score differential with a probability of effecting a desired ranking change, automatically adjusting score values in phases for content items that have been newly introduced into the pool, and/or automatically augmenting a corresponding score value when a content item includes an image.

2.2.3 Client Interface Logic

Client interface logic 124 receives requests from client devices 104-106 and returns responses to the requests. Requests and responses may be transmitted via Hypertext Transfer Protocol (HTTP), Simple Object Access Protocol (SOAP), and/or the like. Each of communication sessions 108-110 includes a set of one or more requests and one or more responses between server computing device(s) 102 and one of client devices 104-106.

A request may include a session identifier that identifies one of communication sessions 108-110, which have been established between server computing device(s) 102 and client devices 104-106. In some embodiments, client interface logic 124 processes requests based on extracting a session identifier from a request and forwarding the session identifier to score value adjustment logic 122. Additionally or alternatively, client interface logic 124 may return responses to requests based on content items, score values, and/or adjusted score values received from score value adjustment logic 122 and/or some other logical component of server computing device(s) 102, such as a logical component that interacts with database 100. For example, client interface logic 124 may receive, from a client device, a request for a set of content items; cause the set of content items to be retrieved from database 100 along with corresponding score values; receive adjusted score values for zero or more content items; sort the set of content items; and send the set of content items to the client device.

2.3 Client Device(s)

Referring to FIG. 1, client devices 104-106 include client applications 126-128. Examples of client devices 104-106 include desktop computers, workstation computers, laptop computers, tablet computers, smartphones, smart televisions, and/or the like. Accordingly, client applications 126-128 may be browsers, native apps, or other programs for rendering content items.

Figure 2:
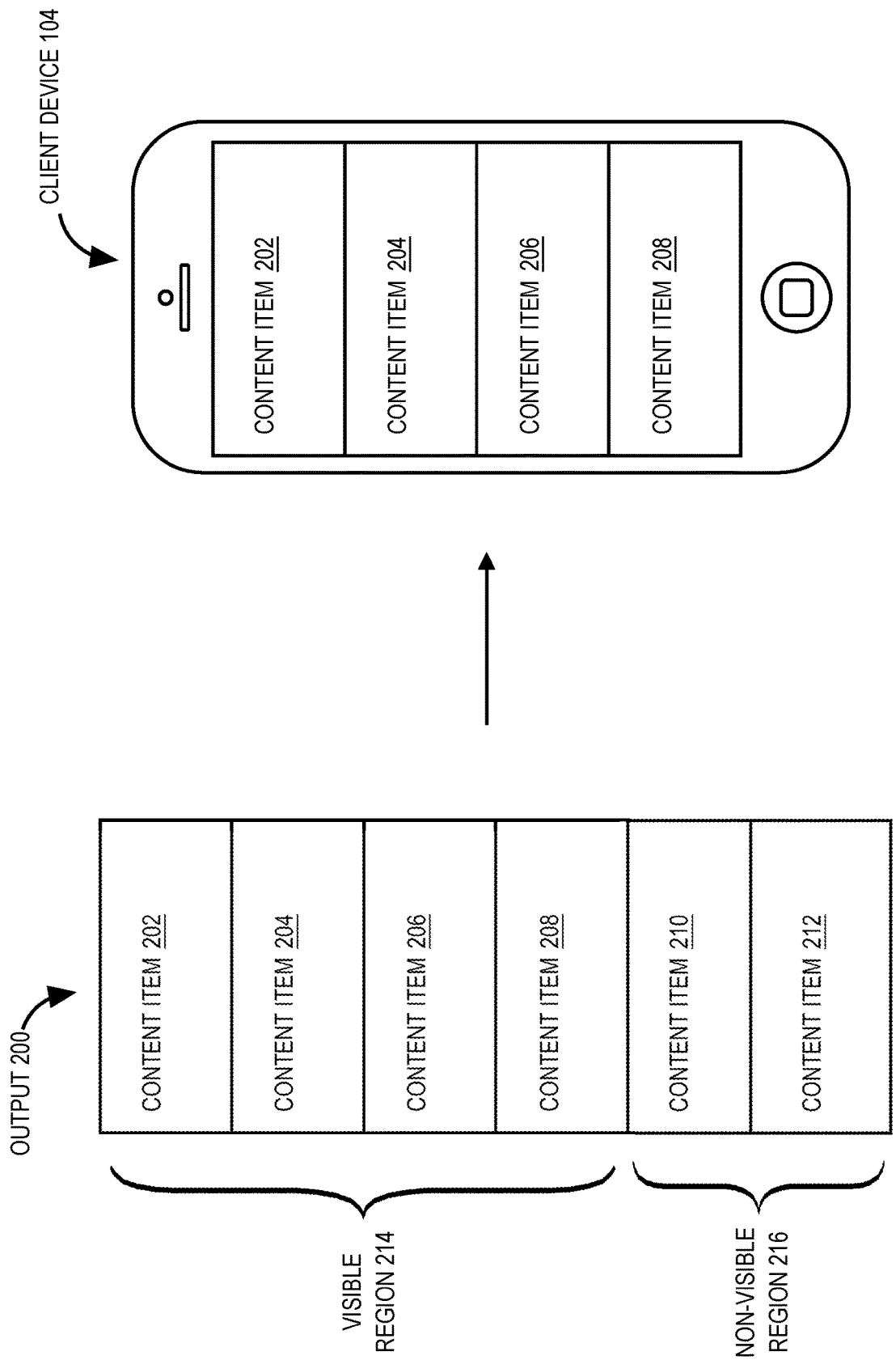
FIG. 2 illustrates an example output page that is rendered via a client computing device.

In the example embodiment of FIG. 2, client device 104 is a smartphone displaying content items 202-208 in visible region 214 of output 200. Output 200 may be broken into multiple output pages or may be maintained as a continuous stream of data. Visible region 214 corresponds to the region "above the fold" of output 200. Output 200 also includes non-visible region 216, which includes content items 210-212. Non-visible region 216 corresponds to the region "below the fold" of output 200. Thus, to view content items 210-212, a user may scroll down output 200.

In FIG. 2, content items 202-212 are sorted in order of decreasing rankings. Thus, content item 202 is placed at the top of output 200, because content item 202 has the highest ranking. However, any of a variety of representations may be used to render content items 202-212 in a sorted order. For example, content items 202-212 may be rendered horizontally with content item 202 at the far left and content item 212 at the far right.

In some embodiments, instead of rendering a first subset of content items 202-212 in visible region 214 and rendering a second subset of content items 202-212 in non-visible region 216, only the first subset of content items 202-212 is rendered. For example, of content items 202-212, only the two content items with the greatest score values may be sent to client device 104 from server computing device(s) 102 via communication session 108.

Disclosed herein are techniques for modifying a score value to influence how, if at all, a particular content item is to be rendered at a particular client device. For example, increasing the score value of content item 210 such that content item 210 has a higher ranking than content item 208 may cause content item 210 to be rendered in visible region 214 instead of non-visible region 216. Additionally or alternatively, decreasing the score value of content item 208 such that content item 208 has a lower ranking than content item 210 may cause content item 208 to be rendered in non-visible region 216 instead of visible region 214.

3.0 Score Value Determination

Before score values 114 are stored in database 100, score values 114 are determined for content items 112. Score values 114 are determined based, at least in part, on previous user interaction with content items 112. Computation of score values 114 may be performed offline. For example, score values 114 may be computed in batches when server computing device(s) 102 undergo maintenance. Additionally or alternatively, computation of score values 114 may be performed at runtime. For example, score values 114 may be re-computed in real-time in response to new user interaction data.

3.1 User Interaction Data

Referring to FIG. 3, table 300 includes example user interaction data related to conversions. More specifically, table 300 includes device ID 302, content item ID 304, time 306, and conversion amount 308.

Device ID 302 includes unique identifiers that reference particular client devices and/or particular client applications. For example, device ID 302 may be media access control (MAC) addresses, globally unique identifiers (GUIDs), and/or the like. User history data may be generated based on storing device ID 302 with user interaction data. As will be described in greater detail below, user history data may be used to generate adjusted score values that are specific to a particular user and/or a particular client device. For example, if a user recently interacted with a content item, further interaction between the user and the content item may be encouraged/discouraged based on increasing/decreasing the visibility of the content item.

Content item ID 304 includes unique identifiers that reference particular content items. In FIG. 3, the first four rows of table 300 are related to a first content item, and the last three rows are related to a second content item. Storing content item ID 304 with user interaction data enables generating different score values for different content items, depending on differences in how users interact with the different content items. For example, a first content item may have a higher score value than a second content item, because more click-through events are associated with the first content item than with the second content item.

Time 306 includes timestamps indicating when a particular interaction with a content item occurred. In FIG. 3, time 306 includes a day of the week, a date in a "month day year" format, and a twenty-four-hour clock time in an "hour minute second" format. Storing time 306 with user interaction data enables organizing the user interaction data according to time periods. Thus, time-based patterns in user interaction with certain content items may be determined. For example, time 306 may be used to organize user interaction data according to meal times in order to determine when a particular content item is most popular.

Conversion amount 308 includes a transactional amount involving a particular content item. For example, conversion amount 308 may indicate an amount of money spent in placing an order at the restaurant advertised by a particular content item. The amount of money may reflect the purchase of a service, such as a delivery, and/or the purchase of a product, such as a food and/or a beverage. Conversion amount 308 is one of various types of user interaction data. As mentioned above, other types include whether a particular content item was viewed, scrolled into view, clicked on, and/or the like. Any number of a variety of techniques may be used to determine a particular type of user interaction. For example, client-side scripting may be used to detect viewing/scrolling, and detecting a request for a particular page may be used to determine a click-through/conversion.

3.2 Computation of Averages

In some embodiments, one or more averages are computed based on user interaction data 116 collected over one or more time periods for a particular content item. For example, user interaction data 116 for content item "381370044307" may be grouped by week, thereby enabling computation of weekly averages of click-through rates, conversion rates, conversion amounts, and/or the like.

Another example of an average computed based on user interaction data 116 collected over one or more time periods is an average advertisement fee. An advertisement fee may be computed for a conversion event based on multiplying an advertisement fee rate to the conversion amount. The advertisement fee rate may vary over different time periods and/or for different content items.

Yet another example of an average computed based on user interaction data collected over one or more time periods is an average reorder rate. As used herein, a "reorder rate" refers to a ratio in which the numerator is the number of users who interacted with a particular content item to place orders multiple times and in which the denominator is the number of users who interacted with the particular content item to place an order only once. The ratio may be based on user interaction data 116 collected within a particular time period, such as the most recent x number of days where x is a predetermined value.

3.3 Exponentially-Decaying Weights

If multiple averages are respectively computed for multiple time periods, the multiple averages may be combined into a single average. In some embodiments, combining the multiple averages involves applying weights, such as exponentially-decaying weights, to the multiple averages.

For example, respective averages for each of a number n of the most recent weeks may be combined using exponentially-decaying weights. A respective weight for each successive week may be halved, thereby enabling assignment of greater weights to more recent user interaction data. To illustrate, the most recent week may be assigned a weight of 50%, the next most recent week may be assigned a weight of 25%, and so forth.

In the context of combining seven weekly conversion amounts into a single average conversion amount for the entire seven-week time period, suppose that the average conversion amounts for the seven most recent weeks are $40, $35, $30, $25, $20, $15, and $10 in order of most recent week to least recent week. Based on applying the exponentially-decaying weights of 50%, 25%, 12.5%, 6.25%, 3.125%, 1.5625%, and 0.78125%, the average conversion amount for the seven-week period is computed to be $35, which is closer in value to the most recent average of $40 than to the least recent average of $10.

3.4 Adjustments to Averages

In some embodiments, one or more averages of user interaction data 116 are adjusted. Adjustment of the one or more averages may be performed for any number of a variety of reasons, which include the following non-limiting example reasons:

to estimate parameters from sample statistics;
to remove anomalous data; and/or
to impart assumptions on unobserved information.

The one or more averages may be adjusted based on any number of a variety of statistical techniques, which include the following non-limiting example techniques:

symmetrically trimmed means;
bootstrapping;
Bayesian processes;
exponentially-weighted averages; and/or
rolling-window averages.

3.5 Score Value Formulas

In some embodiments, an average translates directly into a score value. In some embodiments, an average is transformed into a score value according to a score value formula. Any of a variety of score value formulas may be used. However, in general, a score value formula specifies multiplication of at least three factors: relevance, profit margin, and conversion rate.

4.0 Score Value Adjustment

At a high level, score value adjustment is one of various techniques that can be used to influence the amount of demand for a product and/or a service related to a content item. Demand sources include organic demand and generated demand. Score value adjustment may be based on predictions regarding organic demand and generated demand.

As used herein, organic demand refers to demand derived from offline sources over which server computing device(s) 102 exercise no control. For example, organic demand for a restaurant may be derived by "word of mouth", non-digital print advertisements, and/or the like.

In contrast, generated demand refers to demand derived from activity involving server computing device(s) 102. For example, based on user history data, server computing device(s) 102 may generate targeted digital advertisements that are delivered via email, push notifications, and/or the like. Additionally or alternatively, generated demand may include demand shaped by increasing/decreasing the visibility of a set of content items relative to other sets of content items, increasing/decreasing the visibility of a particular content item within a set of content items, excluding the lowest ranking content item(s) from a set of content items, and/or the like. In the event server computing device(s) 102 receive a request for an excluded content item submitted, for example, via a third-party application, server computing device(s) 102 may respond with a message indicating an estimated delay related to supply constraints, a message suggesting similar content items, and/or the like.

In some embodiments, one or more score values are adjusted based on predictions made by an offline simulator. The offline simulator may predict demand for a content item based on combining its predictions for organic demand and generated demand related to the content item. Thus, the offline simulator may be used to predict the effects of adjusting rankings, to determine score differentials that enable desired ranking changes, and/or the like. Based on the predictions of the offline simulator, one or more score values may be adjusted, at runtime, to generate one or more adjusted score values. In other words, offline simulations can output parameters that determine how to respond in real time to runtime variances without needing to utilize offline computing resources to compensate for the variances.

For example, score value adjustment may be automatically performed for a content item based on any of a number of satisfied criteria including, without limitation, the following:

- for a particular geographic region, the total number of impressions, click-through events, and/or order events exceeds a predetermined threshold value;
- for a particular geographic region, the average click-through rate and/or conversion rate exceeds a predetermined threshold value;
- for a particular geographic region, the total number of content items exceeds a predetermined threshold value;
- for a particular geographic region, the proportion of content items satisfying any of the aforementioned criteria remains below a predetermined threshold value;
- the content item has a click-through rate and/or a conversion rate that is below a predetermined threshold value;
- the most recent ratings for the content item remain above a predetermined threshold value; and/or
- the most recent user interaction data for the content item reflect a total number of impressions, click-through events, and/or order events that exceeds a predetermined threshold value.

In response to determining satisfied criteria, server computing device(s) 102 may automatically adjust a score value based on a score differential, a desired ranking, and/or a desired ranking change determined by the offline simulator.

Referring to FIG. 4, score value adjustment logic 122 takes, as input, score value 400 and provides, as output, adjusted score value 406. To generate adjusted score value 406, score value adjustment logic 122 adds, to score value 400, a score differential that includes random value 402 and score adjustment value 404. As will be described in greater detail below, score adjustment value 404 may be determined by an offline simulator for effecting a desired ranking/ranking change.

In some embodiments, random value 402 is related to a score adjustment value by a multiplication operation. For example, adjusted score value 406 may be generated based on the formula "ScoreAdjustmentValue1*random value 402+ScoreAdjustmentValue2". Thus, random value 402 specifies a probability of effecting a desired ranking/ranking change, especially when ScoreAdjustmentValue1 differs for content items. Additionally or alternatively, random value 402 may be used to determine whether all or part of ScoreAdjustmentValue1 is combined with ScoreAdjustmentValue2. Thus, when ScoreAdjustmentValue1 is the same for a plurality of content items, random value 402 may be used to effect a continuous, as opposed to a discrete, distribution of ranking adjustments without disqualifying any content item from being ranked in a particular position. Furthermore, this can achieve a loosely-ordered and lightly-randomized effect when not all content items have a zero value for ScoreAdjustmentValue2. For example, A can be made to be ranked ahead of B some of the time and ahead of C all of the time.

In some embodiments, random value 402 exhibits an exponential relationship with a score adjustment value. For example, adjusted score value 406 may be generated based on the formula "pow(random value 402, 1/ScoreAdjustmentValue1)+ScoreAdjustmentValue2". In addition to the benefits of the previous formula, this formula enables proportional placement of content items in higher ranks according to score adjustment value 404. ScoreAdjustmentValue1 in this form is particularly advantageous when wanting to control the average distribution of visibility across many user session, but not disqualify any combination of content item ranking.

4.1 Random Value

As used herein, the terms "random" and "pseudorandom" are synonymous unless the context clearly indicates otherwise. Thus, random value 402 is actually a pseudorandom value that is generated for a particular client device and a particular content item. As such, the same content item may have the same random value 402 for the same client device. However, the same content item may have different random values for different client devices.

Figure 5A:
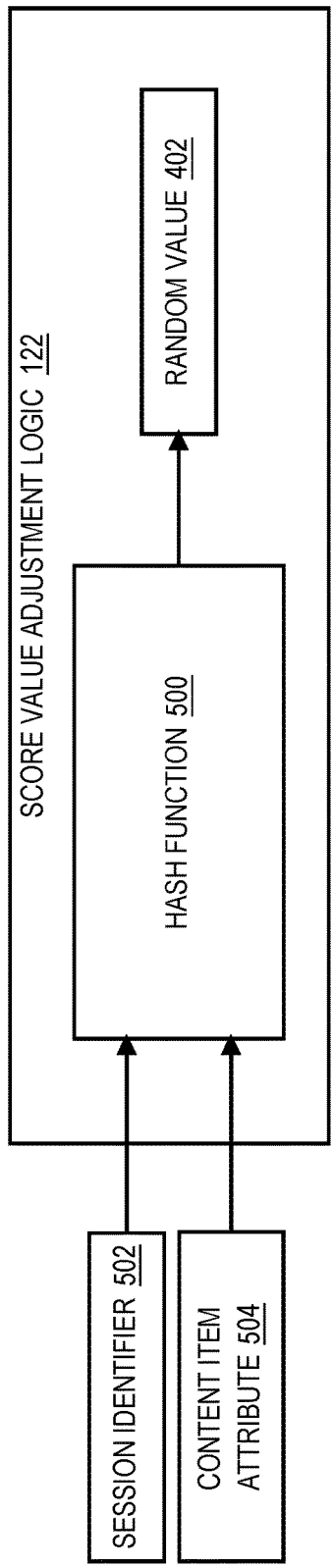
FIGS. 5A-B illustrate approaches for computing a random value.

In the example embodiment of FIG. 5A, score value adjustment logic 122 generates random value 402 based on hash function 500. Inputs to hash function 500 include session identifier 502 and content item attribute 504. Session identifier 500 references a communication session established between server computing device(s) 102 and a particular client device. Content item attribute 504 references an attribute, such as a unique identifier, of a particular content item. Accordingly, random value 402 will be the same for the particular client device and the particular content item throughout the communication session.

Figure 5B:
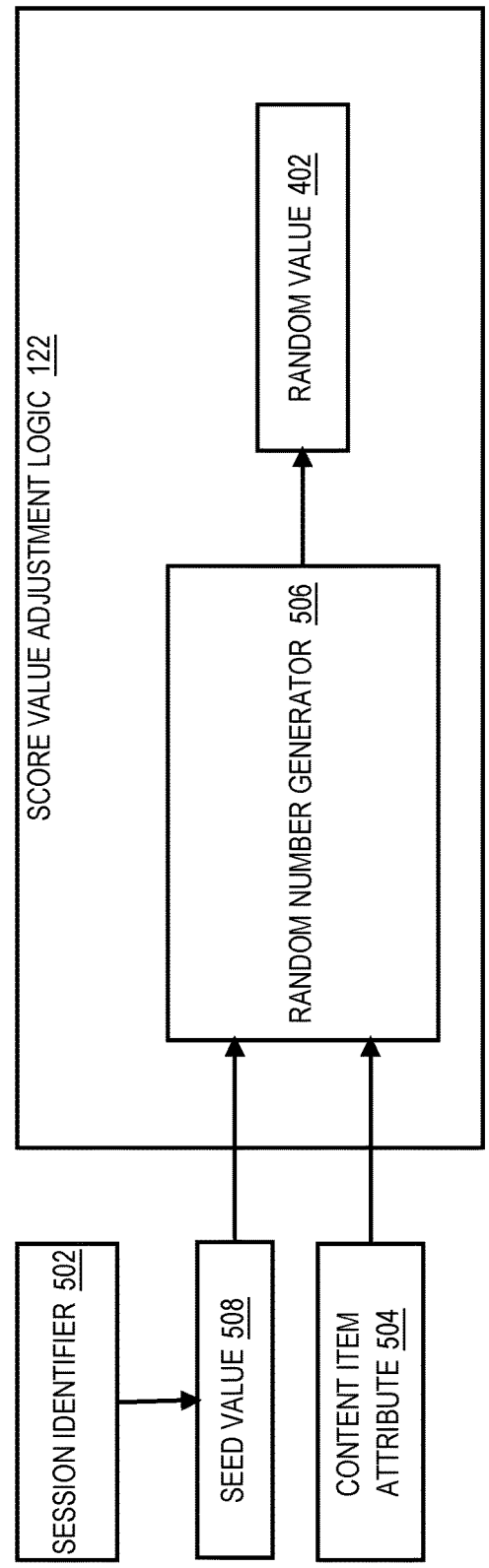

In the example embodiment of FIG. 5B, score value adjustment logic 122 generates random value 402 based on random number generator 506. Inputs to random number generator 506 include seed value 508 and content item attribute 500. Session identifier 502 may be used as seed value 508 for random number generator 506, which generates random value 402 based on taking content item attribute 504 as input. Thus, different random values may be generated for different content items, but the random values will remain constant throughout a particular communication session.

4.2 Score Adjustment Value

In some embodiments, score value adjustment logic 122 includes a plurality of score adjustment values for a plurality of situations. For example, a first score adjustment value may be used to increase the visibility of a particular content item for the duration of a particular mealtime, a second score adjustment value may be used to decrease the visibility of an overutilized content item, a third score adjustment value may be used to increase the visibility of a particular content item that is near a particular location, and a fourth score adjustment value may be used to increase/decrease the visibility of a particular content item at a particular client device. Score adjustment values may be positive or negative values, depending on whether an increase or decrease in visibility is desired.

In general, score adjustment values may be determined/selected/adjusted via real-time responses to inputs received while a communication session is established between server computing device(s) 102 and a client device. Examples of the inputs include a detected context, an explicit/implicit indication of a user preference, a user intent that has been inferred, and/or the like.

Figure 6:
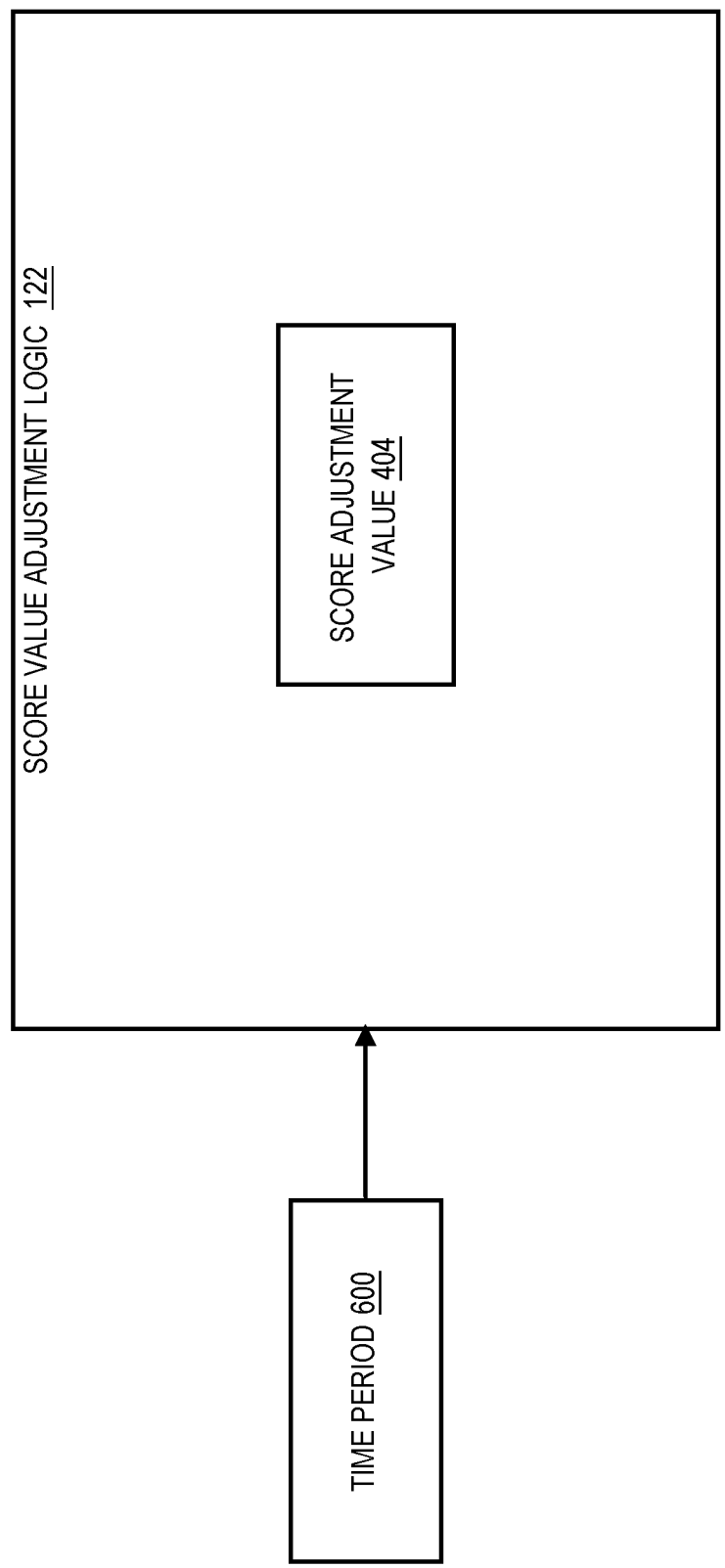
FIG. 6 illustrates an approach for determining a score adjustment value for a particular time period.

Score adjustment values may be used to sort content items according to relevance to a detected context, such as a particular time period, a particular location, and/or the like. In the example embodiment of FIG. 6, score value adjustment logic 122 determines score adjustment value 404 based on time period 600. Time period 600 may indicate a particular time period in a day, one or more days in a week, a holiday, a special event, and/or the like. For example, time period 600 may correspond to one or more hours designated for breakfast, lunch, and/or dinner. Server computing device(s) 102 and/or score value adjustment logic 122 may determine time period 600 based on a current time or a future time. For example, the current time may be obtained from a system clock when a communication session is established, and the future time may be specified by a user in a request submitted from a client device.

Thus, score value adjustment logic 122 may determine/select/adjust score adjustment value 404 to increase and/or decrease the visibility of content items for time period 600. For example, based on user interaction data 116, a particular content item may be determined to be popular around lunchtime, but not dinnertime. Accordingly, the visibility of the particular content item may be increased between the hours of 11 a.m. and 2 p.m.

Similarly, score value adjustment logic 122 may determine score adjustment value 404 based on a current geolocation of a particular client device. For example, Global Positioning System (GPS) coordinates of the particular client device may be provided to score value adjustment logic 122 to cause determining/selecting/adjusting score adjustment value 404 such that content items closer to the particular client device have increased visibility.

Score adjustment values specific to a particular client device may be used to enable personalization of content items. In some embodiments, score value adjustment logic 122 determines score adjustment value 404 based on user interaction data 116. For example, user interaction data 116 may indicate one or more conversions for a particular content item at a particular client device. In response to determining that the one or more conversions previously occurred at the particular client device, score value adjustment logic 122 may determine/select/adjust score adjustment value 404 to increase and/or decrease the visibility of the particular content item at the particular client device.

To illustrate, user interaction data 116 may indicate restaurants from which a user of a particular client device has ordered food deliveries in the past x number of days, where x is a predetermined value. Content items advertising those restaurants may have their score adjustment values modified to increase or decrease their visibility, depending on whether the purpose of the score adjustment values is to cater to user preferences or to push the user to try new things.

Figure 7:
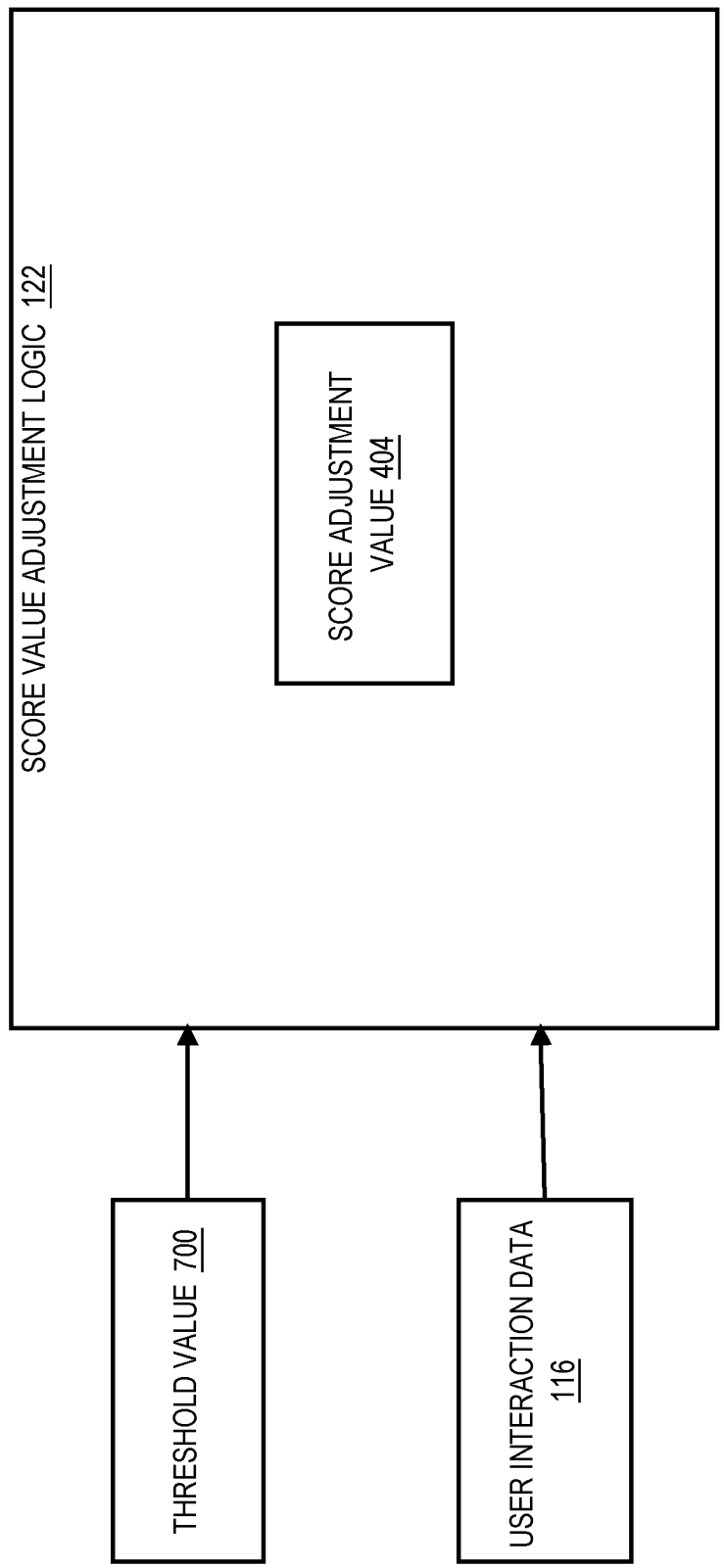
FIG. 7 illustrates an approach for determining a score adjustment value in response to detecting high demand for a particular content item.

Score adjustment values may be used to offload demand from content items at risk of being overutilized. In the example embodiment of FIG. 7, score value adjustment logic 122 determines score adjustment value 404 based on user interaction data 116 and threshold value 700. For example, user interaction data 116 may indicate a number of conversions for a particular content item within a particular time period. However, threshold value 700 may indicate a supply constraint for the particular content item. For example, threshold value 700 may be a number of deliveries or a number of food items beyond which a restaurant advertised by the particular content item has historically exhibited difficulty in providing without significant delay. Thus, threshold value 700 may be an estimated value for a plurality of content items or an estimated value specific to a particular content item. For example, threshold value 700 may be an average number of a particular dish that is ordered at a particular mealtime from a restaurant advertised by the particular content item.

Based on user interaction data 116, score value adjustment logic 122 may determine that threshold value 700 has been exceeded for a particular time period. In response, score value adjustment logic 122 may determine/select/adjust score adjustment value 404 to decrease the visibility of a particular content item. As a result, other content items may benefit from increased visibility. Thus, demand may be offloaded to the other content items, which may be recommended, to users exhibiting interest in the particular content item, based on similarity of goods/services offered, proximity, and/or the like.

Score adjustment values may be used to sort content items according to relevance to user intent that has been inferred. User interaction data 116 and/or geolocation data 118 may be used to infer user intent. For example, geolocation data 118 may include GPS coordinates and device ID 302 indicating historical location information for a particular client device. Based on the historical location information, a future location and/or a future travel path may be predicted for a user. In other words, inferring user intent may involve detecting one or more patterns in the historical location information.

Figure 8:
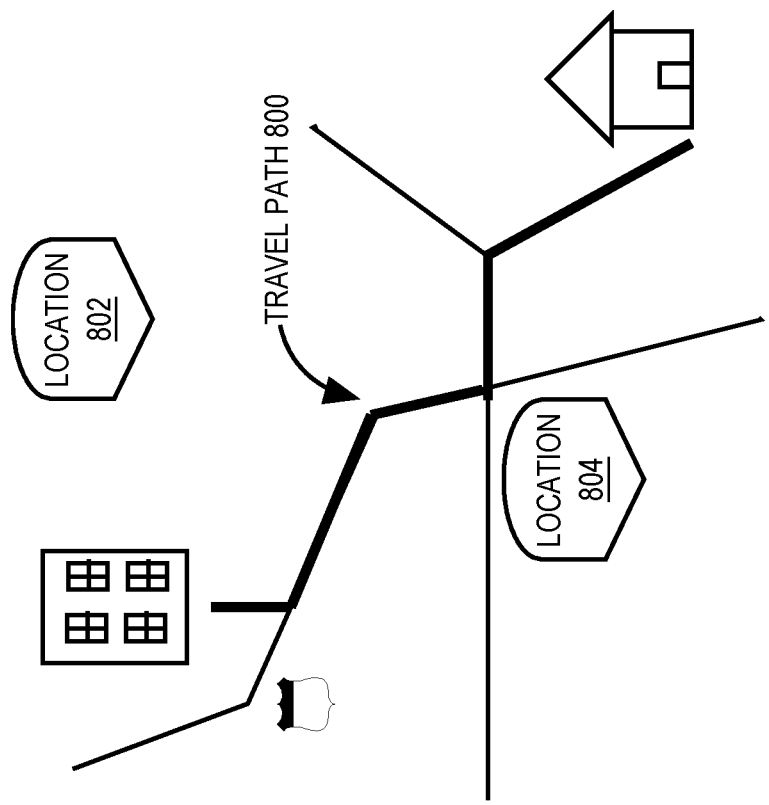
FIG. 8 illustrates an approach for determining a score adjustment value according to a distance from a predicted travel path.

In the example embodiment of FIG. 8, travel path 800 is a future travel path predicted based on a detected pattern of commuting between home and work for a particular client device. For clarity and ease of explanation, travel path 800 is depicted as if displayed on a graphical user interface that includes a map. However, it should be appreciated that it is unnecessary for server computing device(s) 102 to display travel path 800 when travel path 800 is determined.

Locations 802-804 correspond to content items to be rendered at the particular client device. Prior to being rendered, the content items may be sorted according to their respective distances from travel path 800. This may involve determining/selecting/modifying one or more score adjustment values to increase/decrease the visibility of the content items. For example, the score adjustment value of the content item corresponding to location 804 may be adjusted such that it is ranked higher than the content item corresponding to location 802.

In some embodiments, a positive differential and a negative differential are used together. For example, a buff amount may be added to the score value of the content item corresponding to location 804, and a nerf amount may be added to the score value of the content item corresponding to location 802.

4.3 Multi-Phase Score Values

There may be multiple phases of score value adjustment for some content items. Each phase may correspond to a particular time period, and a different weight value may be used in each phase.

For example, a content item advertising a newly opened restaurant would normally have, at best, a very low score value, because there is little, if any, user interaction data 116 for the content item. Thus, the content item, if rendered at all at a client device, would have very poor visibility, which makes it difficult for the content item to attract the user interaction necessary to increase visibility. To address this problem, a buff amount may be added to the intrinsic score value of the content item to artificially increase its visibility. However, the intrinsic score value of the content item may change dramatically during the first month or so after the restaurant's opening. Thus, the buff amount may be too large at some times and too small at other times.

To resolve this conundrum, different buff amounts may be used during different time periods within the first month or so after the restaurant's opening. For example, a large weight value may be used in the first few days and replaced with successively smaller weight values every couple of days thereafter until the intrinsic score value alone can be used with the content item. The different time periods may be uniformly predetermined for all new content items. For example, each new content item may start with a weight value sufficient to cause the content item to have the highest possible visibility, and every five days thereafter, the weight value may be decreased by five percent. Alternatively, the different time periods may be customized for each new content item based on detecting significant changes in the intrinsic score value. For example, the weight value may be decreased whenever the intrinsic score value increases by at least ten percent.

4.4 Multiple Sets of Rankings

In some embodiments, multiple sets of content items are concurrently rendered at a client device. Thus, multiple sets of rankings may be used to sort the multiple sets of content items. For example, content items that include images may be sorted separately from content items lacking images. The content items that include images may be rendered at the top of an output page as a first set of content items, and the content items lacking images may be rendered, below the first set, as a second set of content items. Each set of content items may be arranged vertically or horizontally.

In some embodiments, for at least one set of content items, a limited number of content items are rendered to a user. For example, a first set of content items may be arranged vertically, in an output page, above a second set of content items. If at least part of the second set is to be rendered in a visible region of the output page, then a limited number of content items from the first set should be rendered at the top of the output page. The limited number may be a predetermined number. To illustrate, the first set may include content items that are sorted according to a decreasing order of advertisement fee rates. However, of the first set, only the top five content items may be rendered to the user.

In some embodiments, the limited number of content items is/are determined, at least in part, on a random basis. For example, the first set may be sorted according to adjusted score values that are based on the same weight value for each content item in the first set. Content items corresponding to the top three adjusted score values may be rendered to the user. This approach has the effect of creating a weighted random sampling as opposed to a weighted random sort and can be used, for example, to randomly populate a fixed number of advertising placements.

5.0 Process Overview

Figure 9:
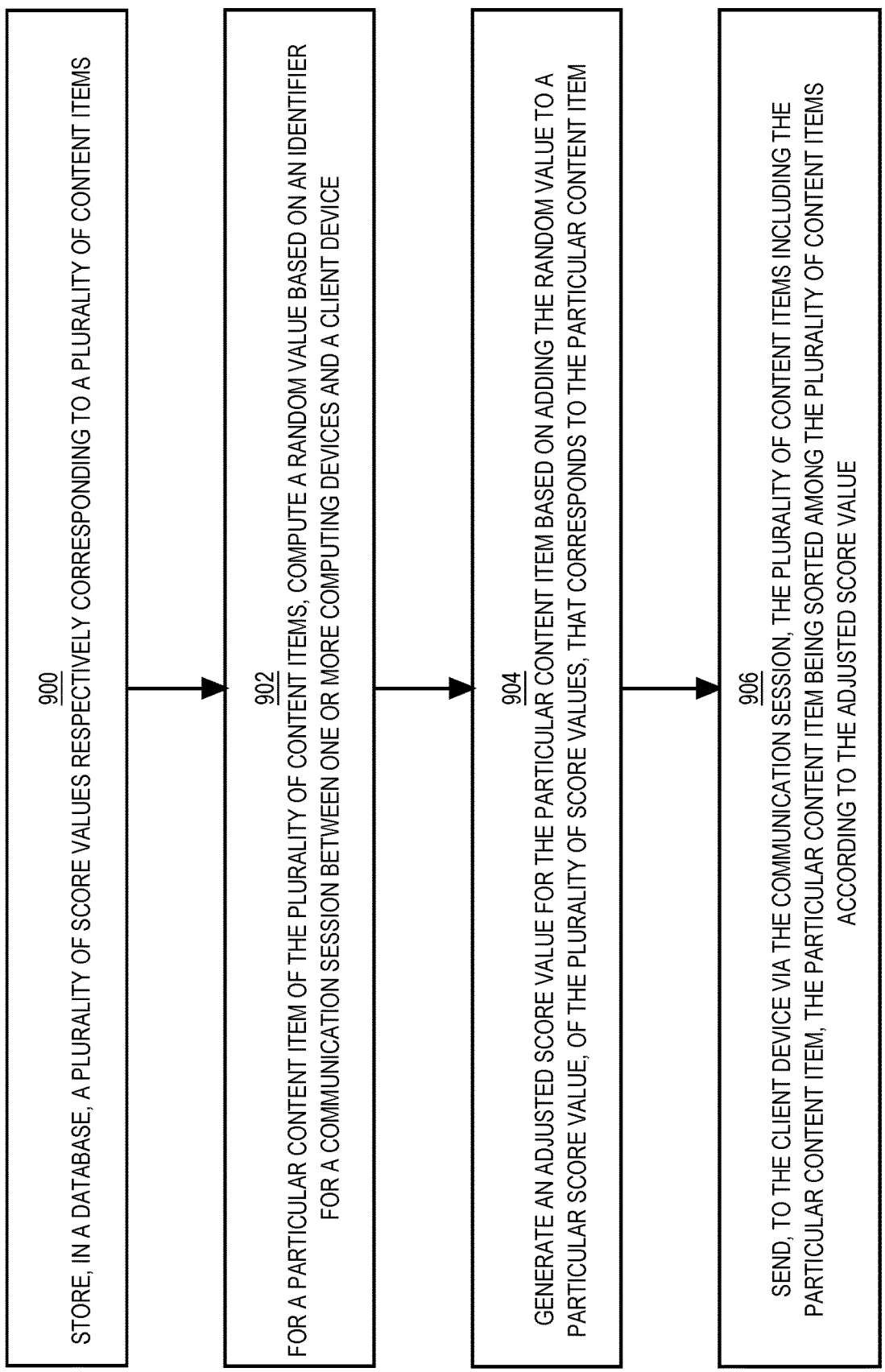
FIG. 9 illustrates an approach for real-time distribution and adjustment of content placement.

FIG. 9 is a flow diagram that illustrates an approach for real-time distribution and adjustment of content placement. Based on implementing the approach, server computing device(s) 102 may adjust the visibility of one or more content items.

At block 900, server computing device(s) 102 may store score values 114 in database 100. Score values 114 may correspond respectively to content items 112. Prior to being stored in database 100, score values 114 may be determined based, at least in part, on user interaction data 116 for content items 112.

In some embodiments, score values 114 are determined based on assigning a greater weight to more recent user interaction data. For example, exponentially-decaying weights may be applied to weekly averages of user interaction data 116.

In some embodiments, score values 114 are determined based on treating content items 112 as having been rendered previously at least a minimum number of times. For example, a constant value may be added to the number of impressions used to compute score values 114.

In some embodiments, score values 114 are determined based on differentiating between a previous rendering in visible region 214 of output 200 and a previous rendering in non-visible region 216 of output 200. For example, a content item may have a visibility factor indicating how often the content item is rendered in visible region 214. The visibility factor may be multiplied to a number of impressions to derive a number of visible impressions, which may be used to compute a score value for the content item.

At block 902, server computing device(s) 102 may compute random value 402 based on session identifier 502. Session identifier 502 may reference communication session 108 established between server computing device(s) 102 and client device 104. In some embodiments, random value 402 is computed based on hashing session identifier 502 and an attribute 504 of the particular content item. In some embodiments, random value 402 is computed based on using session identifier 502 as seed value 508 for random number generator 506, which takes, as input, an attribute 504 of the particular content item.

At block 904, server computing device(s) 102 may generate adjusted score value 406 for a particular content item based on adding random value 402 to score value 400. Prior to adding random value 402 to score value 400, score adjustment value 404 may be adjusted for random value 402. Score adjustment value 404 may be adjusted to increase or decrease the visibility of the particular content item.

In some embodiments, visibility is determined based, at least in part, on whether the particular content item is rendered in visible region 214 or non-visible region 216 of output 200. For example, adjusted score value 406 may cause the particular content item to be included in a first subset of a plurality of content items to be rendered, at client device 104, in visible region 214 of output 200 instead of being included in a second subset of the plurality of content items to be rendered, at client device 104, in non-visible region 216 of output 200. Alternatively, adjusted score value 406 may cause the particular content item to be included in a first subset of a plurality of content items to be rendered, at client device 104, in non-visible region 216 of output 200 instead of being included in a second subset of the plurality of content items to be rendered, at client device 104, in visible region 214 of output 200.

In some embodiments, score adjustment value 404 is adjusted to decrease the visibility of the particular content item in response to server computing device(s) 102 determining that the particular content item is at risk of being in an overutilized condition. This condition may be determined based on user interaction data 116 collected from a plurality of client devices. Based on user interaction data 116, server computing device(s) 102 may determine that a number of conversions for the particular content item has exceeded threshold value 700.

In some embodiments, score adjustment value 404 is adjusted to increase/decrease the visibility of the particular content item in response to server computing device(s) 102 determining that a conversion for the particular content item previously occurred at client device 104. Server computing device(s) 102 may make this determination based on user interaction data 116 collected from client device 104. Increased visibility may be desired to encourage repeated interaction with the particular content item, and decreased visibility may be desired to discourage repeated interaction with the particular content item.

In some embodiments, score adjustment value 404 is adjusted to increase the visibility of the particular content item according to a distance between a predicted travel path 800 and a location 802,804 corresponding to the particular content item. In other words, content items that are closer to travel path 800 may be ranked higher. Travel path 800 may be predicted based on geolocation data 118 collected from client device 104.

In some embodiments, score adjustment value 404 is adjusted to increase the visibility of the particular content item for a particular time period, such as a particular mealtime. Server computing device(s) 102 may determine the particular time period based on a time at which communication session 108 was established. Increased visibility may be desired to promote more relevant content items at the expense of less relevant content items.

At block 906, server computing device(s) 100 may send, to client device 104 via communication session 108, a plurality of content items to be rendered at client device 104. The plurality of content items may include the particular content item, which is sorted among the plurality of content items in a sort order determined according to adjusted score value 406.

In some embodiments, a similar process may be performed for client device 106. The similar process may be performed prior to, concurrently with, or subsequent to the process illustrated in FIG. 9 for client device 104. Notably, even if the same content items are rendered at client devices 104-106, client device 104 may render them in a different order from client device 106. This is because communication session 110 is different from communication session 108, thereby resulting in different session identifiers. Session identifiers may be permanent or made to expire and be replaced. Different session identifiers enable different sort orders based on causing different pseudorandom values to be associated with content items.

After block 906, a user may interact with the particular content item at client device 104, thereby providing feedback in the form of further user interaction data. In some embodiments, the process illustrated in FIG. 9 iterates based on the user interaction data collected after block 906. Thus, block 906 may proceed to block 900 in a feedback loop. For example, user interaction with the particular content item at a ranking of "1" may be used as feedback data to confirm an intrinsic score value for the particular content item, to refine the intrinsic score value for the particular content item, and/or to compute a different adjusted score value for the particular content item. In other words, the feedback loop may be part of a machine learning process for determining one or more optimal placements for the particular content item.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
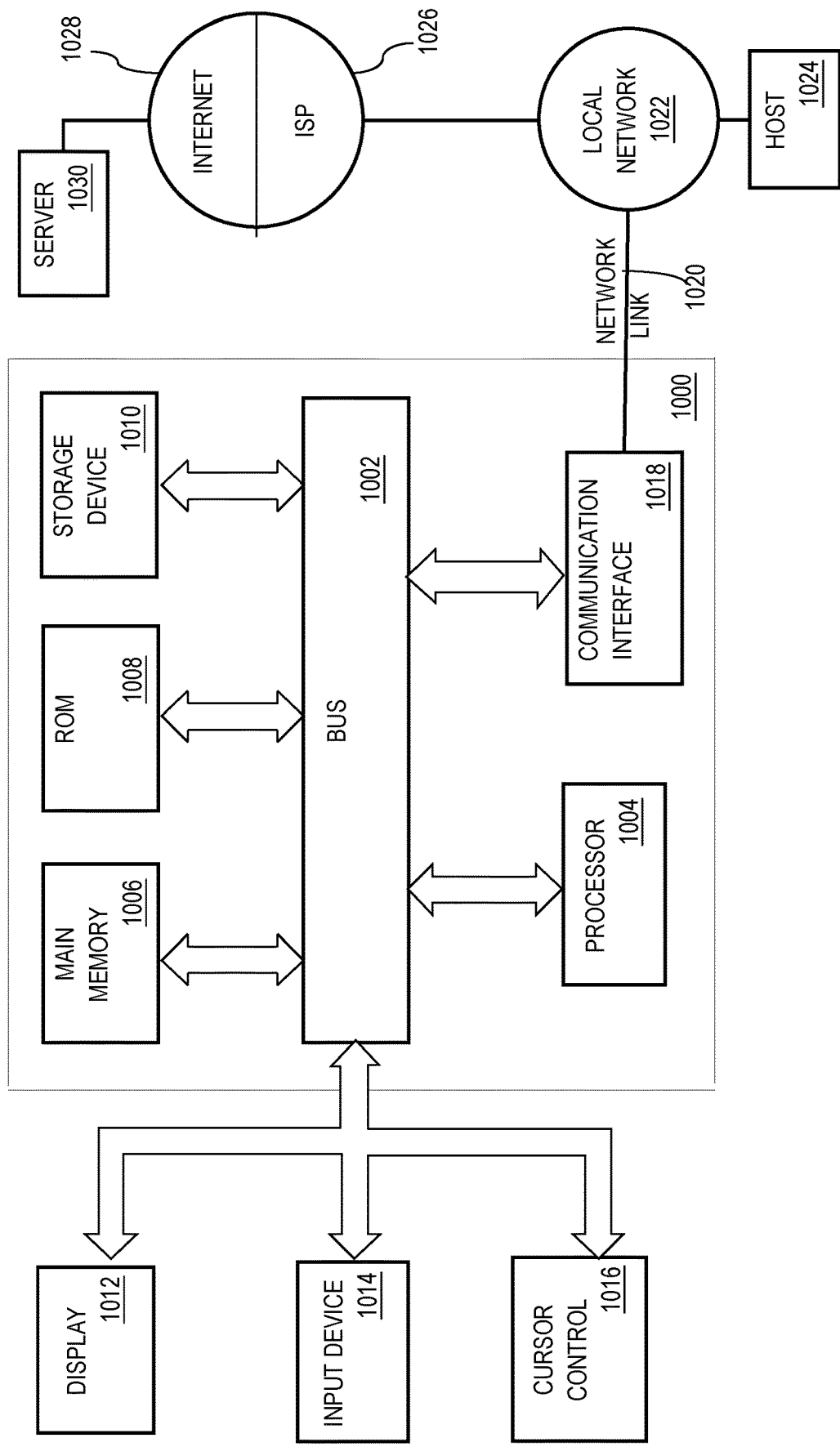
FIG. 10 illustrates a computer system on which embodiments may be implemented.

For example, FIG. 10 is a block diagram that illustrates a computer system 1000 upon which an embodiment of the disclosure may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system that is programmed for adjusting, at runtime, visibility of a particular content item of a plurality of content items in a rendering of restaurant data, the system comprising:

a database that is configured to store a plurality of score values respectively corresponding to the plurality of content items, wherein a score value of the plurality of score values is used to rank a respective content item with respect to other content items;

one or more computing devices that are coupled to the database and to one or more digital data storage devices storing instructions which, when executed using the one or more computing devices, cause the one or more computing devices to:

compute, for the particular content item of the plurality of content items, a first random value based on a first session identifier that identifies a first communication session between the one or more computing devices and a first client device;

generate a first adjusted score value for the particular content item based on combining the first random value with a particular score value, of the plurality of score values, that corresponds to the particular content item;

generate, based at least in part on the first adjusted score value for the particular content item, a randomized ranking of the particular content item with respect to the plurality of content items;

send, to the first client device via the first communication session, the plurality of content items including the particular content item, the particular content item being sorted, in a first sort order, among the plurality of content items according to the randomized ranking based at least in part on the first adjusted score value.

2. The system of claim 1, wherein the one or more digital data storage devices store further instructions which, when executed using the one or more computing devices, cause the one or more computing devices to:
  compute, for the particular content item of the plurality of content items, a second random value based on a second session identifier that identifies a second communication session between the one or more computing devices and a second client device, wherein the second session identifier is different from the first session identifier;
  generate a second adjusted score value for the particular content item based on combining the second random value with the particular score value, of the plurality of score values, that corresponds to the particular content item;
  generate, based at least in part on the second adjusted score value for the particular content item, a second randomized ranking of the particular content item with respect to the plurality of content items, wherein the second randomized ranking is different from the first-referenced randomized ranking;
  send, to the second client device via the second communication session, the plurality of content items including the particular content item, the particular content item being sorted, in a second sort order, among the plurality of content items according to the randomized ranking based at least in part on the second adjusted score value, wherein the second sort order is different from the first sort order.

3. The system of claim 1, wherein the first random value is computed based on hashing the first session identifier for the first communication session and an attribute of the particular content item.

4. The system of claim 1, wherein the first random value is computed based on using the first session identifier for the first communication session as a seed value for a random number generator that takes, as input, an attribute of the particular content item.

5. The system of claim 1, wherein the first adjusted score value causes the particular content item to be included in a first subset of the plurality of content items that is rendered, at the first client device, in a visible region of an output instead of being included in a second subset of the plurality of content items that is rendered, at the first client device, in a non-visible region of the output.

6. The system of claim 1, wherein the first adjusted score value causes the particular content item to be included in a first subset of the plurality of content items that is rendered, at the first client device, in a non-visible region of an output instead of being included in a second subset of the plurality of content items that is rendered, at the first client device, in a visible region of the output.

7. The system of claim 1, wherein the one or more digital data storage devices store further instructions which, when executed using the one or more computing devices before the first adjusted score value for the particular content item is generated, cause the one or more computing devices to:
  determine, based on user interaction data collected from a plurality of client devices, that a number of conversions for the particular content item has exceeded a threshold value;
  in response to determining that the number of conversions for the particular content item has exceeded the threshold value, determine a score adjustment value to decrease the visibility of the particular content item.

8. The system of claim 1, wherein the one or more digital data storage devices store further instructions which, when executed using the one or more computing devices before the first adjusted score value for the particular content item is generated, cause the one or more computing devices to:
  determine, based on user interaction data collected from the first client device, that a conversion for the particular content item previously occurred at the first client device;
  in response to determining that the conversion for the particular content item previously occurred at the first client device, determine a score adjustment value to increase the visibility of the particular content item.

9. The system of claim 1, wherein the one or more digital data storage devices store further instructions which, when executed using the one or more computing devices before the first adjusted score value for the particular content item is generated, cause the one or more computing devices to:
  predict, based on geolocation data collected from the first client device, a travel path for the first client device;
  in response to predicting the travel path for the first client device, determine a score adjustment value to increase the visibility of the particular content item according to a distance between the travel path and a location corresponding to the particular content item.

10. The system of claim 1, wherein the one or more digital data storage devices store further instructions which, when executed using the one or more computing devices before the first adjusted score value for the particular content item is generated, cause the one or more computing devices to:
  determine a particular time period during which the first communication session was established;
  determine a score adjustment value to increase the visibility of the particular content item for the particular time period.

11. A method for adjusting, at runtime, visibility of a particular content item of a plurality of content items in a rendering of restaurant data, the method comprising:
  storing, in a database, a plurality of score values respectively corresponding to the plurality of content items, wherein a score value of the plurality of score values is used to rank a respective content item with respect to other content items;
  computing, for the particular content item of the plurality of content items, a first random value based on a first session identifier that identifies a first communication session between one or more computing devices and a first client device;
  generating a first adjusted score value for the particular content item based on combining the first random value with a particular score value, of the plurality of score values, that corresponds to the particular content item;
  generating, based at least in part on the first adjusted score value for the particular content item, a randomized ranking of the particular content item with respect to the plurality of content items;
  sending, to the first client device via the first communication session, the plurality of content items including the particular content item, the particular content item being sorted, in a first sort order, among the plurality of content items according to the randomized ranking based at least in part on the first adjusted score value;
  wherein the method is performed by the one or more computing devices.

12. The method of claim 11, further comprising:
  computing, for the particular content item of the plurality of content items, a second random value based on a second session identifier that identifies a second communication session between the one or more computing devices and a second client device, wherein the second session identifier is different from the first session identifier;

generating a second adjusted score value for the particular content item based on combining the second random value with the particular score value, of the plurality of score values, that corresponds to the particular content item;

generating, based at least in part on the second adjusted score value for the particular content item, a second randomized ranking of the particular content item with respect to the plurality of content items, wherein the second randomized ranking is different from the first-referenced randomized ranking;

sending, to the second client device via the second communication session, the plurality of content items including the particular content item, the particular content item being sorted, in a second sort order, among the plurality of content items according to the randomized ranking based at least in part on the second adjusted score value, wherein the second sort order is different from the first sort order.

13. The method of claim 11, wherein the first random value is computed based on hashing the first session identifier for the first communication session and an attribute of the particular content item.

14. The method of claim 11, wherein the first random value is computed based on using the first session identifier for the first communication session as a seed value for a random number generator that takes, as input, an attribute of the particular content item.

15. The method of claim 11, wherein the first adjusted score value causes the particular content item to be included in a first subset of the plurality of content items that is rendered, at the first client device, in a visible region of an output instead of being included in a second subset of the plurality of content items that is rendered, at the first client device, in a non-visible region of the output.

16. The method of claim 11, wherein the first adjusted score value causes the particular content item to be included in a first subset of the plurality of content items that is rendered, at the first client device, in a non-visible region of an output instead of being included in a second subset of the plurality of content items that is rendered, at the first client device, in a visible region of the output.

17. The method of claim 11, further comprising, before generating the first adjusted score value for the particular content item:

determining, based on user interaction data collected from a plurality of client devices, that a number of conversions for the particular content item has exceeded a threshold value;

in response to determining that the number of conversions for the particular content item has exceeded the threshold value, determining a score adjustment value to decrease the visibility of the particular content item.

18. The method of claim 11, further comprising, before generating the first adjusted score value for the particular content item:

determining, based on user interaction data collected from the first client device, that a conversion for the particular content item previously occurred at the first client device;

in response to determining that the conversion for the particular content item previously occurred at the first client device, determining a score adjustment value to increase the visibility of the particular content item.

19. The method of claim 11, further comprising, before generating the first adjusted score value for the particular content item:

predicting, based on geolocation data collected from the first client device, a travel path for the first client device;

in response to predicting the travel path for the first client device, determining a score adjustment value to increase the visibility of the particular content item according to a distance between the travel path and a location corresponding to the particular content item.

20. The method of claim 11, further comprising, before generating the first adjusted score value for the particular content item:

determining a particular time period during which the first communication session was established;

determining a score adjustment value to increase the visibility of the particular content item for the particular time period.

* * * * *